US006829439B1

(12) United States Patent
Sidorovich et al.

(10) Patent No.: US 6,829,439 B1
(45) Date of Patent: Dec. 7, 2004

(54) OPTICAL COMMUNICATION DEVICE

(75) Inventors: Vladimir G. Sidorovich, Moscow (RU); Aleksei A. Leshev, St. Petersburg (RU); Valery V. Ragulsky, Moscow (RU); Mikhail A. Sadovnikov, Moscow Russia (RU); Mikhail V. Vasiliev, St. Petersburg (RU); Vladimir P. Vasiliev, Moscow (RU)

(73) Assignee: Meklyn Enterprises Limited, Larnaca (CY)

( * ) Notice: Subject to any disclaimer, the term of this patent is extended or adjusted under 35 U.S.C. 154(b) by 690 days.

(21) Appl. No.: 09/705,936

(22) Filed: Nov. 6, 2000

(30) Foreign Application Priority Data

Jun. 8, 2000 (RU) ........................................ 2000114465

(51) Int. Cl.[7] .............................................. H04B 10/00
(52) U.S. Cl. ...................................... 398/131; 398/156
(58) Field of Search ............................ 343/753, 911 L; 398/129, 131, 156

(56) References Cited

U.S. PATENT DOCUMENTS

| 3,713,163 A | 1/1973 | Keller et al. |
| 4,170,400 A | 10/1979 | Bach et al. |

(List continued on next page.)

FOREIGN PATENT DOCUMENTS

| GB | 2180116 | 1/1988 |
| JP | 03-326970 | 6/1993 |
| WO | PCT/GB00/00456 | 2/2000 |

OTHER PUBLICATIONS

M. Mitchell et al., "A Multiple–Beam Multiple–Frequency Spherical Lens Antenna System Providing Hemispherical Coverage", Antenna and Propagation ICAP 89, Apr. 4–7, 1989.*

Primary Examiner—Leslie Pascal
Assistant Examiner—Shi K. Li
(74) Attorney, Agent, or Firm—McDermott Will & Emery LLP

(57) ABSTRACT

Free-space optical communication uses multibeam communications, for example between a base station and multiple remote stations. To improve efficiency and reduce complexity, the base station transmitter utilizes a single wide-angle objective lens for all of the optical beams' radiation sources. The optical radiation sources are provided with fiberoptic transmitting pigtails with output ends installed on a curved surface in relation to the single wide-angle objective lens at locations in the areas optically conjugated with the remote subscriber receivers. In a system for two-way communication, optical receivers are provided with fiberoptic receiving pigtails with input ends positioned on the curved surface at locations relative to the wide-angle objective lens, which are optically conjugated with the remote subscriber radiation sources. In the preferred embodiments, the mountings of the output and input ends of the transmitting and the receiving pigtails enable their movement along the curved surface as well as along an optical beam axis. Also, a preferred embodiment of the optical system enables movement of the wide angle objective lens together with the output and input ends of the transmitting and the receiving pigtails about horizontal and vertical axes.

29 Claims, 11 Drawing Sheets

U.S. PATENT DOCUMENTS

| | | |
|---|---|---|
| 4,716,417 A | 12/1987 | Grumet |
| 4,736,463 A | 4/1988 | Chavez |
| 4,855,751 A | 8/1989 | Ingerson |
| 4,935,630 A | 6/1990 | Merchant |
| 5,062,150 A | 10/1991 | Swanson et al. |
| 5,148,322 A | 9/1992 | Aoyama et al. |
| 5,218,356 A | 6/1993 | Knapp |
| 5,345,336 A | 9/1994 | Aoyama et al. |
| 5,606,444 A | 2/1997 | Johnson et al. |
| 5,655,068 A | 8/1997 | Opoczynski |
| 5,710,652 A | 1/1998 | Bloom et al. |
| 5,745,941 A | 5/1998 | Miller, Sr. |
| 5,777,768 A | 7/1998 | Korevaar |
| 5,786,923 A | 7/1998 | Doucet et al. |
| 5,870,216 A | 2/1999 | Brock et al. |
| 5,909,296 A | 6/1999 | Tsacoyeanes |
| 6,091,074 A | 7/2000 | Korevaar |
| 6,118,131 A | 9/2000 | Korevaar |
| 6,141,128 A | 10/2000 | Korevaar et al. |
| 6,252,719 B1 * | 6/2001 | Eichenbaum ............... 359/634 |
| 6,266,029 B1 * | 7/2001 | Lee et al. ................ 343/911 L |
| 6,304,694 B1 * | 10/2001 | Ford ........................... 385/33 |
| 6,327,063 B1 * | 12/2001 | Rockwell ................... 398/122 |
| 6,329,956 B1 * | 12/2001 | Tateishi et al. ............. 343/753 |
| 6,335,811 B1 * | 1/2002 | Sakanaka ................... 398/129 |
| 6,445,496 B1 | 9/2002 | Presby et al. |
| 6,522,437 B2 | 2/2003 | Presley et al. |
| 6,624,916 B1 * | 9/2003 | Green et al. ................ 398/170 |

* cited by examiner

One of Baseterminal Transmitters

One of Baseterminal Receivers

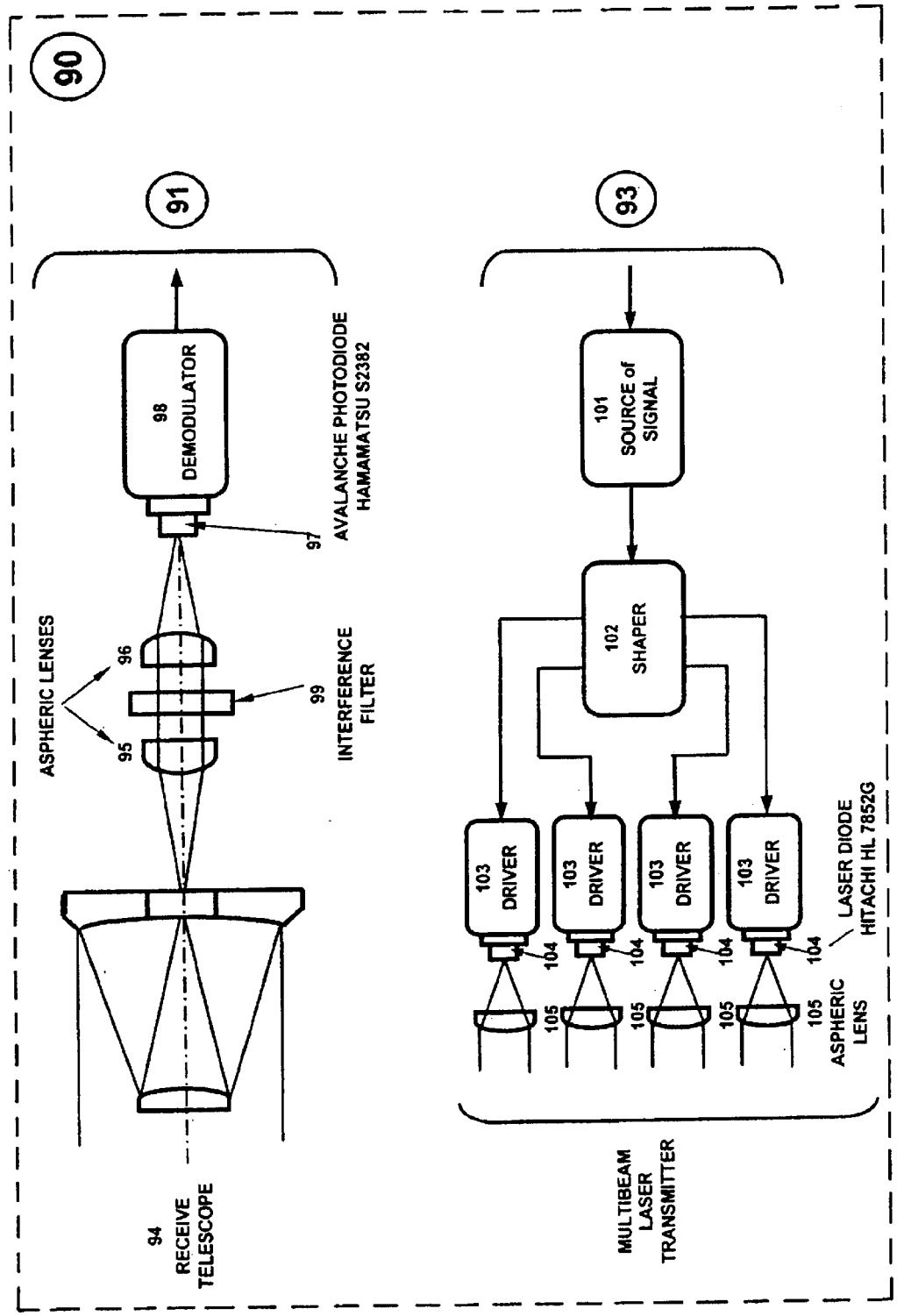
Fig. 9 SUBSCRIBER TERMINAL

OPTICAL COMMUNICATION DEVICE

FIELD OF THE INVENTION

The invention is related to free-space optical communications systems and may be used for two-way information transfer between remote objects without use of wires and/or optical fibers, including the case when multiple users are taking part in the information exchange, e.g. if network (mesh) technologies are used for information transfer, or if point-to-multipoint technology is implemented for a two-way information exchange between a base station and several subscribers.

BACKGROUND

The modern information age has developed a pattern of continually increasing demand for communication capacity. A variety of optical fiber and wired technologies now provide high bandwidth with attendant high data rates for communications to customer premises, but installation of such facilities is not practical in all locations. In many major population centers, installation of a new physical facility of this type requires underground installation with a high construction cost. The construction and the attendant requirement for local government approval impose considerable time delays. In many instances, the actual available capacity through long delayed deployments lags far behind the ever-increasing demand. Radio frequency (RF) wireless solutions reduce the time, complexity and cost of installation, but those solutions are inherently limited by their use of shared RF spectrum. As the number of users on a given piece of spectrum grows, the average capacity available to any one user declines.

Free-space optical communications systems offer two-way information transfer between remote objects without use of wires and/or optical fibers. Because such systems can implement point to point links to the individual customer premises, such systems are not subject to the limits of shared capacity, as in the existing RF wireless technologies. Free-space optical communications systems may implement network (mesh) technologies for information transfer or point-to-multipoint technology for a two-way information exchange.

U.S. Pat. No. 5,786,923, for example, discloses a point-to-multipoint bi-directional wide area telecommunications network employing atmospheric optical communication. The network comprises a primary transceiver unit, an optical router, and subscriber transceiver units. The primary transceiver unit generates a first light beam, which carries modulated data intended for end users. The optical router receives the first light beam and demodulates the data. The optical router then remodulates the data onto a second light beam and transmits the second light beam to the subscriber transceiver units. The optical router demodulates and retransmits to each of the subscriber transceiver units in a time-multiplexed fashion. In the patented system, each subscriber transceiver unit includes an optical receiver/transmitter. This optical "antenna" is coupled to an input/output device, such as a set-top box and television set or a computer or television, by an optical fiber or cable. The subscriber transceiver units receive the second light beam and demodulate the data. In the upstream direction, each subscriber transceiver unit atmospherically transmits a third light beam, which includes data from the user equipment. The subscriber transceiver sends this beam to the optical router. The optical router demodulates the upstream data, modulates it onto a fourth light beam, and transmits the fourth light beam to the primary transceiver unit.

Free-space optical communications involve multibeam communications. Accordingly, key components of free-space optical communication systems are multibeam optical transmitters with beams that may be targeted at prescribed objects arbitrarily positioned in space, as well as optical receivers for reception of signals arriving from such objects. These components enable wireless optical data communications and associated networking.

Realization of multibeam optical transmitters or receivers using the multichannel principle, i.e. as a set of separate channels of the same type operating point-to-point, multiplies the weight, dimensions, and cost of the entire system at least N-fold if N beams or directions should be implemented for communications.

The basic parameter of a multibeam communication system is a bit rate or bandwidth allocated to a communication network subscriber. It is evident that in a prior art multichannel system ratios between bandwidth dedicated to a single subscriber and total weight and cost of the entire system, decreases at least as fast as the number of beams. In other words, the efficiency of multibeam system implemented as a set of separate channels measured by the above mentioned ratios decreases, in comparison with a single-beam system, at least in proportion to a number of beams. This is the main technical and economical problem related to creation of multibeam free-space communication systems designed to provide information exchange for multiple objects (subscribers).

The optical space communication device is known, consisting of at least one receiver and one transmitter implemented as several sources of light located in the same plane around the receiver. The sources are installed with different inclinations to the setting plane so that the angles of deviation from the perpendicular to the plane increases with the distance to the receiver, providing the absence of intersection of beams from sources with different inclinations to the perpendicular (see the description of the Japanese patent application No. 63326970, publication No. H 04 B 10/10/ 1990 /1/). The disadvantages of the known device are: the difficulty of alignment of the sources relative to the receivers at which they shall be aimed, the difficulty of readjustment of the sources after the receivers have been moved, and large divergence of radiation illuminated by the sources, which requires either high power of the radiation, or high sensitivity of the receivers (both causing an increase of weight and size). The last circumstance (high divergence of the radiation) also requires narrowing the receiving bandwidth, as less power approaching a receiver provide for narrower telecommunication bandwidth for the same reliability of telecommunication.

A telemetry system is known, using an optical communication device (see the description of the Great Britain patent No. 2180116, H 04 B 9/00, 1987 /2/). The communication device is implemented in the form of several receivers and a transmitter consisting of several radiation sources installed on a curved surface, e.g. a hemisphere. The disadvantages of the known device are the following: difficulty of sources alignment relative to receivers corresponding to them and limited area of the system applications due to short ranges of communications caused by large energy losses (because of large divergence of optical beams radiated by the sources), and hence narrow bandwidth of the system.

U.S. Pat. No. 5,909,296 discloses an optical communication device having a transmitter with optical radiation modulation means, and one or more optical radiation receivers with light demodulation means. The transmitter is implemented as a set of radiation sources arranged on a convex surface and aimed at the receivers. To decrease irradiated beams divergence, each radiation source has its own microlens. The disadvantage of this device is its complicated design, which requires a separate lens for each transmitter radiation source. This complexity leads to a corresponding increase of the system weight and cost. Furthermore, the sources of optical radiation are fixed relative to the lenses, which prohibits any correction of the beamwidth and beam direction when the distance and/or angle between the receiver and the transmitter change. Thus, in spite of the irradiated beams divergence reduction due to the lenses, the system efficiency remains low because of excess energy losses as well as because of increased system weight and cost.

U.S. Pat. No. 3,713,163 discloses an antenna capable of delivering a plurality of beams centered about a single boresight axis that includes a focusing means, such as a parabolic reflector or lens. Plural arrays, each including plural radially aligned antenna elements extending along the boresight axis, are located in proximity to a focal point for the focusing means. The elements of the plural arrays are independently exited. Each of the arrays is independently rotated about the boresight axis. The disadvantage of this device is that plural beams derived by it are being aligned about a single boresignt axis and may provide tracking and communication only with targets located within narrow angle. To transmit electromagnetic radiation toward widely separated locations would require multiple instances of the narrow-beam antenna system. Another disadvantage is that antenna elements are located in the focal surface of the focusing means without using mounts enabling their movement along axes of respective radiated electromagnetic beams. This prohibits optimization of beam diameter on a target and causes significant energy loss.

From the above discussion it becomes clear that there is an ongoing need for multi-beam wide-angle optical transmitter and receiver systems, for use in free-space optical communications, which have an increased efficiency. There is a specific need for such systems designed to minimize energy loss and thereby allow increased transmission rates and/or distances. There also is a need for such optical transmitter and receiver systems having a simplified structure, to reduce complexity, weight and cost. There is a further need for such systems that are easily adjustable in the field, to compensate for changes in alignment with remote transceiver units.

SUMMARY OF THE INVENTION

The optical communication device, which is the subject of this application, pursues simplification of the design and operation, as well as reduction of energy losses. Also, the proposed free-space optical communication device allows an increase in information transfer bit rate and/or a maximum distance of reliable information transmission relative to weight, cost, and power consumption of a multibeam free-space optical communication system. A further objective of the invention is to reduce the weight and power consumption of the system, and the cost of a unit bandwidth allocated to every subscriber.

To achieve the above stated objectives and overcome the problems with existing systems, the proposed optical communication device includes a transmitter, implemented as several optical radiation sources installed on a curved surface and radiation modulation means. The device is equipped with a single wide-angle objective lens positioned between the radiation sources and respective remote subscriber receivers, in such a manner that the radiation sources are located in the areas optically conjugated with the subscriber receivers.

Preferably, every radiation source is installed on the curved surface in a way providing for its movement along the surface as well as along an optical beam irradiated by the source. Also, to achieve the above objectives, optical receivers may be positioned on the curved surface, so that they are optically conjugated relative to the wide-angle objective with respective remote subscriber radiation sources. Preferably, the receivers are installed on the curved surface in a way providing for their movement along the surface as well as along the optical axes of their received beams. The objective lens may be implemented to allow rotation thereof around an arbitrary axis together with the radiation sources and the receivers.

The distinctive features of the preferred embodiment are:
  equipping the transmitter with a single wide-angle objective lens and placing the objective between the radiation sources and the subscriber receivers;
  positioning the radiation sources in the areas optically conjugated with the subscriber receivers;
  installation of the radiation sources on a curved surface in a way providing for their movement along the surface as well as along the axes of beams irradiated by the sources;
  placing the wide-angle objective lens between the receivers and the subscriber radiation sources;
  positioning the receivers on the curved surface and their optical conjugation with the subscriber radiation sources relative to the wide-angle objective lens;
  installation of the receivers on the curved surface in a way providing for their movement along the surface and along the axes of the received beams;
  implementation of the objective lens in a way providing for its rotation around an arbitrary axis together with the radiation sources and the receivers.

Placing of a single wide-angle objective lens between the radiation sources and the remote subscriber receivers makes it possible to simplify the optical communication device design, and hence to increase the multibeam communication system efficiency, because, instead of a multitude of lenses or other optical radiation concentrating elements used for every radiation source and every receiver or for every group of receivers located within narrow angle, only one shared wide-angle objective lens is used.

Positioning the radiation sources in areas optically conjugated with the corresponding subscriber receivers provides for optimal concentration of the radiation from each radiation source positioned on the curved surface onto a photosensitive area of the corresponding subscriber receiver. Thus a further increase of the device efficiency is obtained, which can be measured by an increase of the information transmission bit rate and the range of the system operation, or by a decrease of power consumption and size/weight of the system.

The installation of the radiation sources with an ability to move them along the curved surface provides for reliable device operation via correct positioning of the sources relative to the objective lens and the corresponding subscriber receivers. The possibility of the source shifting within the curved surface and along the beam axis provides for maintenance of optimum optical conjugation of the source and the subscriber receiver if variation occurs in the direction at the subscriber receiver or in the distance between the source and the subscriber receiver, and thus provides for minimization of energy losses and, as a final result, for information transmission rate and range of the device operation increase.

The source shifting along the beam axis also allows to maintain optimal beam diameter on the subscriber optical receiving aperture, providing for a balance between energy concentration onto a photosensitive area of a receiver and the system tolerance to the beam's axis instability. The larger the beam diameter on a subscriber's receiving aperture the lower the energy concentration and the higher the tolerance.

The positioning on the curved surface of the receivers optically conjugated with the subscriber radiation sources allows for implementation of a two-way communication with the subscribers using one and the same objective for the transmission as well as for the reception of information, thus further simplifying the device' design and reducing its cost.

Implementation of the objective lens with an ability of rotating it around an arbitrary axis together with the radiation sources and the receivers simplifies the device' operation and provides for increase of information transmission rate or operation range of the communication system in specific implementation cases—when the transmitter's and the subscribers' receivers and radiation sources are placed on carriers moving relative to each other, e.g. if the transmitter is installed on a high mast swinging under the wind.

Installation of the receivers on the curved surface with an ability to move them along the surface as well as along the axis of the received beams makes it possible to maintain the optical conjugation of the subscriber radiation sources with the receivers, corresponding to them, when angle and distance between the receivers and the subscriber radiation sources changes, and hence to reduce the power consumption and to increase the range of the device operation and information transmission capacity.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The essence of the device, which is the subject of this application, is explained by the examples of its implementation as well as by the drawings discussed below. In the various figures, like reference numerals refer to the same or similar elements.

FIG. 9 is an optical functional block diagram of one of the subscriber terminals.

DETAILED DESCRIPTION OF EMBODIMENTS

Figure 1:
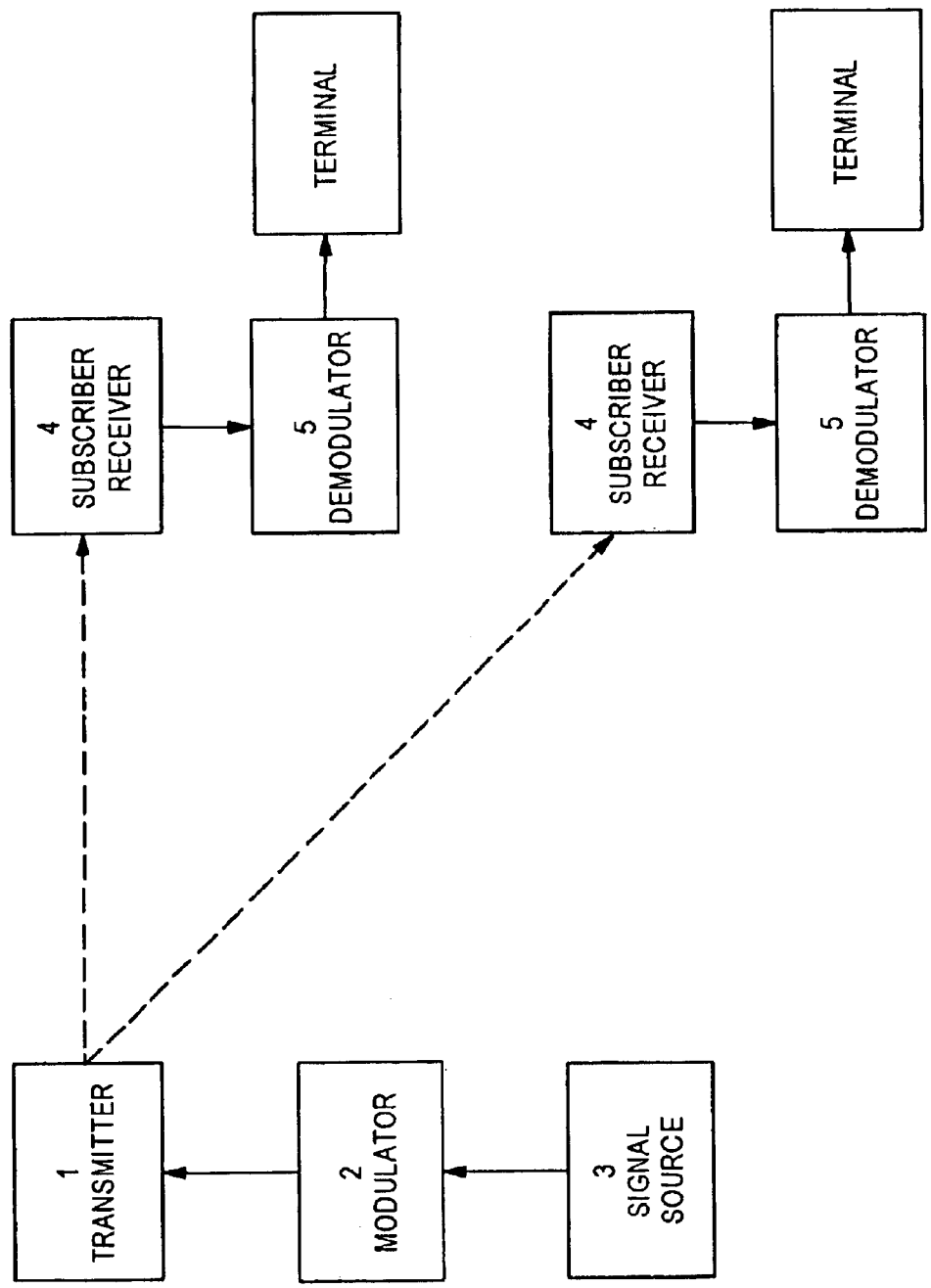
FIG. 1 is a functional block diagram of an optical communication system utilizing the concepts of the present invention for point-to-multipoint downstream transmissions.

The invention utilizes a single wide-field-of-view objective lens to operate multiple communication beams going to or coming from a plurality of remote subscriber terminals. The concepts apply to a transmit-system, to a transmit-and-receive system or to a receive-system. As a first example, consider the transmit-system of FIG. 1.

In a case when the optical communication device is designed, for instance, only to transmit information from a single terminal (the transmitting side of the communication system) to several remote subscribers (the receiving side of the communication system), the system contains a transmitter 1, which may be implemented with several optical radiation sources (e.g. lasers) selected from a multitude of known ones. The most suitable option from the point of view of weight, size, and power consumption is the use of semiconductor laser diodes or noncoherent light emitting diodes operating in various wavelength diapasons.

As the radiation sources suitable for transmission rates up to several hundred megabits per second, single-mode laser diodes may be used with a Fabri-Perot cavity, an output power up to 50 mW, and an intensity modulation via pumping current control, or vertical cavity laser diodes providing even higher than lasers with Fabri-Perot cavity transmission rates however at a lower output power level. At lower bit rates (10 to 40 megabits per second) light emitting diodes can be used, also current-modulated. At the bit rates higher than 1 gigabit per second, distributed-feedback laser diodes may be used; if an output power level higher than provided by semiconductor radiation sources is required, a convenient solution is to use an erbium-doped fiberoptic amplifier (EDFA) with a low-power master oscillator.

A modulator 2 is connected to the transmitter; the modulator 2 can be of any known type (electro-optical, acousto-optical, mechanical, electrical, etc.), providing any type of modulation (phase, frequency, amplitude, etc.). The modulator 2 can thereby provide a modulation similar for all the radiation sources, as well as different types of modulation in accordance with different content of information transmitted to different subscriber receivers or with different kind of information encoding required by the subscribers (for example, several radiation sources can be frequency-modulated, the other phase-modulated). In particular cases a change of modulation methods may be provided for one and the same radiation sources. Different types of signal sources 3 may be connected to the modulator 2. For example, it may be video signals from a TV studio, audio signals, or a signal from a fiber optic data communication network, or a combination of the above signals. Each transmitter 1 is provided with a driver, which is an electronic circuit maintaining the optimum operation mode of the radiation sources and providing the output radiation modulated in accordance with the input information, which should be transmitted to each of the subscriber receivers. Each of the transmitter radiation sources is optically conjugated with a corresponding remote subscriber receiver 4, implemented, for example, as an optical telescope coupled to a photodetector or any other known optics and associated devices providing transformation of optical radiation into electrical signals. The first drawing shows two of the remote subscriber stations, although there may be many more.

Fast-response PIN-photodiodes or avalanche photodiodes are used in the receivers 4 in most cases. The last ones allow to obtain a higher receive sensitivity using the photocurrent multiplication. Each photodiode is provided with an electronic circuit maintaining the optimum operation mode of the photodiode and used to filter and restore the original information signal.

The subscriber receiver 4 is connected to a demodulator 5, which can be of any known type, depending on the optical radiation modulation method. The demodulator 5 demodulates received information and outputs that information to an associated terminal device, in an appropriate signal format.

Figure 2:
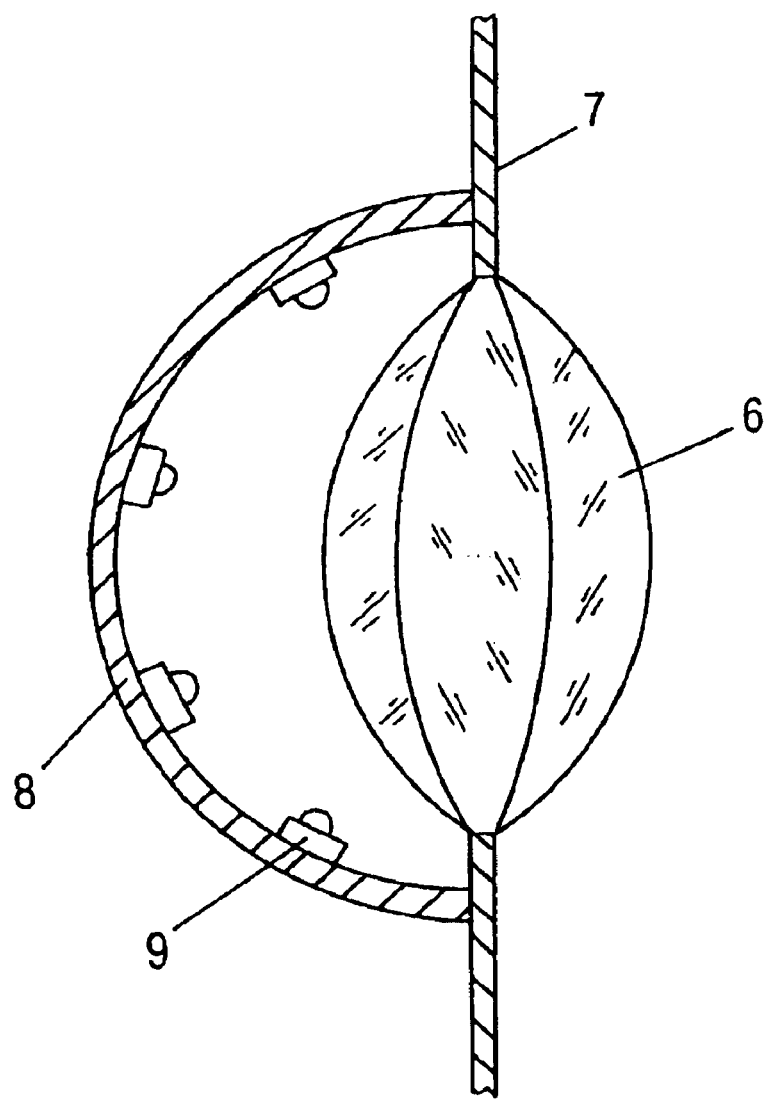
FIG. 2 is a simplistic cross-sectional view of the transmitter with the wide-angle objective, for use in a system such as that shown in FIG. 1.

In accordance with the invention, the transmitter 1 includes a wide-angle objective 6 fastened in a holder 7, as shown for example in FIG. 2. The objective lens 6 may be of any known type providing for wide field-of-view: e.g., a concentric objective lens, particularly a ball made of an optically transparent material, etc. The objective lens 6 is embraced by a curved surface 8 where the radiation sources 9 are attached. In the illustrated embodiment, the actual transmitter radiation sources (e.g., laser diodes) 9 are mounted on the curved surface 8. In a later embodiment, the radiation sources (electrical-to-optical transducers) are at a slightly separate location, and an optical fiber pigtail couples each transducer to the desired point on the curved surface 8.

The curved surface 8 preferably is implemented at or near the focal surface of the lens 6, so that the radiation sources 9 attached to it may be by minor longitudinal shifts positioned in the areas optically conjugated with the subscriber receivers. In particular, the objective focal surface may serve as such surface. Correspondingly, the shape and curvature of this surface will depend on the objective lens type and will have to be changed if the objective lens is replaced with a different one.

The radiation sources 9 are attached to the surface 8 in a known way so that in specific implementation cases they can be moved within the curved surface 8 and along the axes of their radiated optical beams, with a consequent fixing. For example, the mounting can be a screw joint, installation on magnetic holders, etc. (not shown).

All of the above mentioned optoelectronic components may be used for implementation of the receivers and radiation sources in the free-space optical communication device, which is the subject of this patent application. To place a maximum number of the radiation sources 9 on the curved surface 8 and be able to serve maximum number of subscribers, it is advisable to provide a fiberoptic pigtail for every source of output radiation and to use the output ends of the pigtails as the radiation sources installed on the above curved surface 8. In such case, only very compact end faces of thin pigtails are installed on the curved surface 8 itself.

In a similar fashion, to place a maximum number of the radiation sensors on the curved surface in a two-way implementation, it is advisable to provide a fiber optic pigtail for every receiver of input radiation and to use the receiving ends of the pigtails as the radiation detectors installed on the above curved surface. In such case, only the end faces of thin pigtails are installed on the curved surface itself. The actual radiation-to-electrical signal transducers receive light energy delivered by the pigtails at any convenient remote position.

The use of optical fibers attached to the radiation sources allows to maximize the "packing density" of "transmission points" on the curved surface (and also maximize the "packing density" of the "reception points" if the receivers are also positioned on the same curved surface); and if the device which is the subject of the patent application is installed in an open place without protection against external environment conditions effects, this allows installation of the major part of the opto-electronic equipment in a protected housing.

Another advantage of using the optical fibers is that multiple semiconductor lasers with different wavelengths may be coupled through appropriate diffraction gratings into each of the fiber pigtails, providing for implementation of wavelength division multiplexing (WDM). As a result, one beam carries significantly higher information transmission rates. Similarly, several radiation sensors may be coupled to one fiber through a chromatic demultiplexer (e.g., Bragg diffraction grating) to detect several input data streams carried by several different wavelengths.

The transmitter terminal, like the subscriber terminals, may be connected to computers with corresponding interface cards, but as the device subject for the patent application is primarily designed for high bit transmission rates, the transmitter terminal shall preferably be attached through high performance multiplexers/demultiplexers to communication network nodes of fiber optic lines carrying high-bit-rate information streams, as well as communication network nodes providing multimedia services. In this case, the interim data sources and receivers are the hub stations, equipped with multiplexers/demultiplexers and routers.

The device operates in the following way. First, the optical conjugation is arranged between the radiation sources and the subscriber receivers. To ensure this, the sources 9 are attached to the curved surface 8 so that the beams passing through the objective 6 are targeted at the corresponding to them subscriber receivers 4 and have relevant wavefront curvature to optimally approach the subscriber receivers' sensitive areas. The signal from a signal source 3 is applied to the radiation sources 9 via the modulator 2 modulating every radiation source optical radiation in accordance with the information stream destined for the corresponding subscriber receiver. The modulated optical radiation reaches the corresponding subscriber receiver 4, where the optical radiation is transformed into an electrical signal. The latter is then applied to a demodulator 5, and then comes to the subscriber (user) terminal as digital information, video, audio signals, etc.

Figure 3:
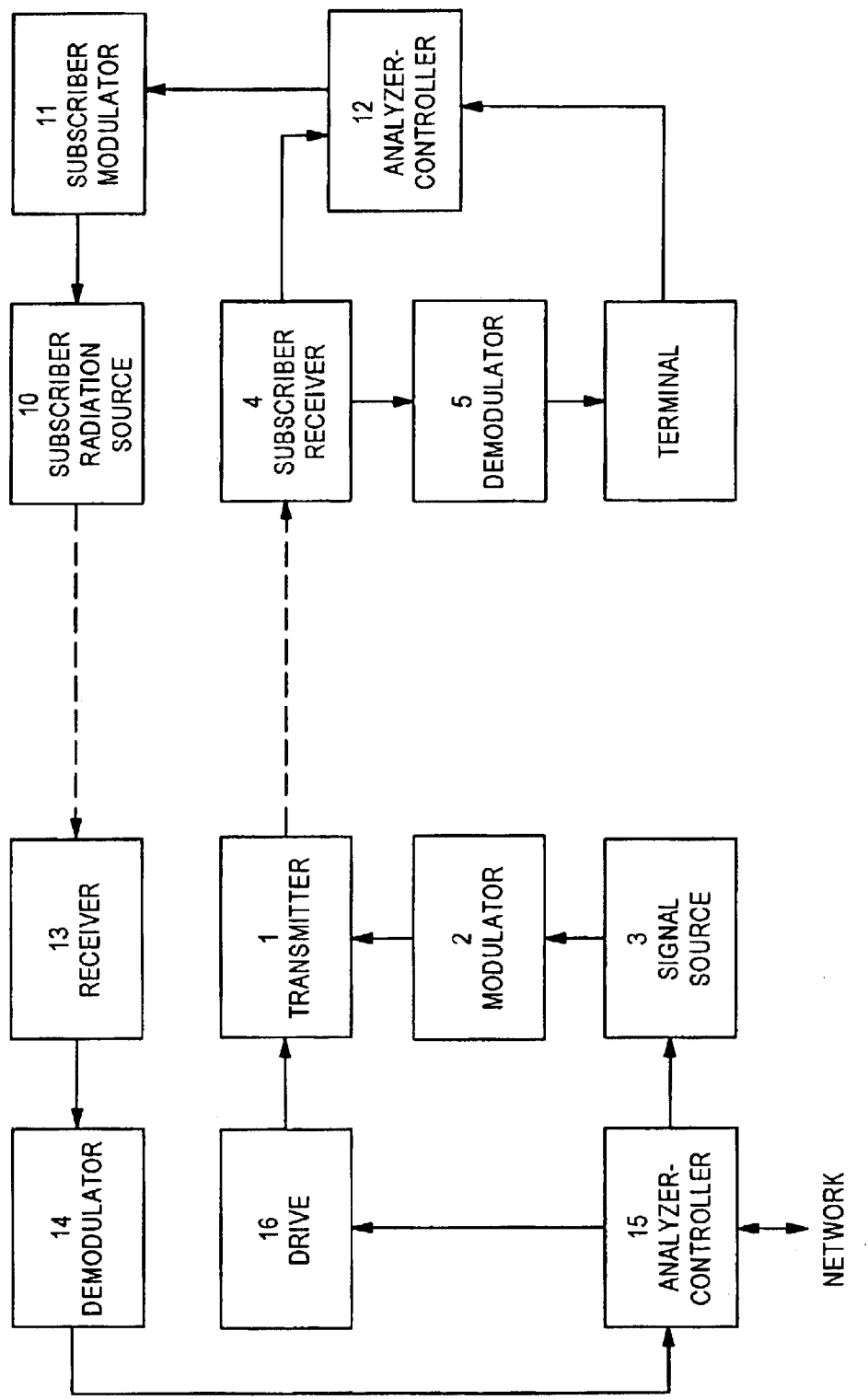
FIG. 3 is a functional block diagram of an optical communication system utilizing the concepts of the present invention for two-way communications.

In a particular case when a two-way communication is provided, the communication system may be implemented as shown in FIG. 3.

The communication system includes transmitter 1 connected to the signal source 3 via the modulator 2. The device is provided with the subscriber receiver 4, from which the received signal is routed to the subscriber (user) via the demodulator 5. The subscriber terminal has a subscriber radiation source 10 with a corresponding subscriber modulator 11 and an analyzer/controller unit 12, the input of which is connected to the subscriber receiver 4, whereas the output connects to the subscriber modulator 11.

The base station terminal is equipped with the receivers 13 positioned on the curved surface 8. The base station terminal also is equipped with a demodulator 14, an analyzer/controller unit 15 and an electromechanical drive 16. The controller unit input is connected to the demodulator 14 output, and the outputs—to the signal source 3 and the drive 16 providing for a movement of the objective together with the receivers 13 and the radiation sources 9. The receivers 13 are optically conjugated with the corresponding subscriber radiation sources 10 by the objective lens 6. Microprocessors or computers may be used as the controllers in 12 and 15.

Figure 4:
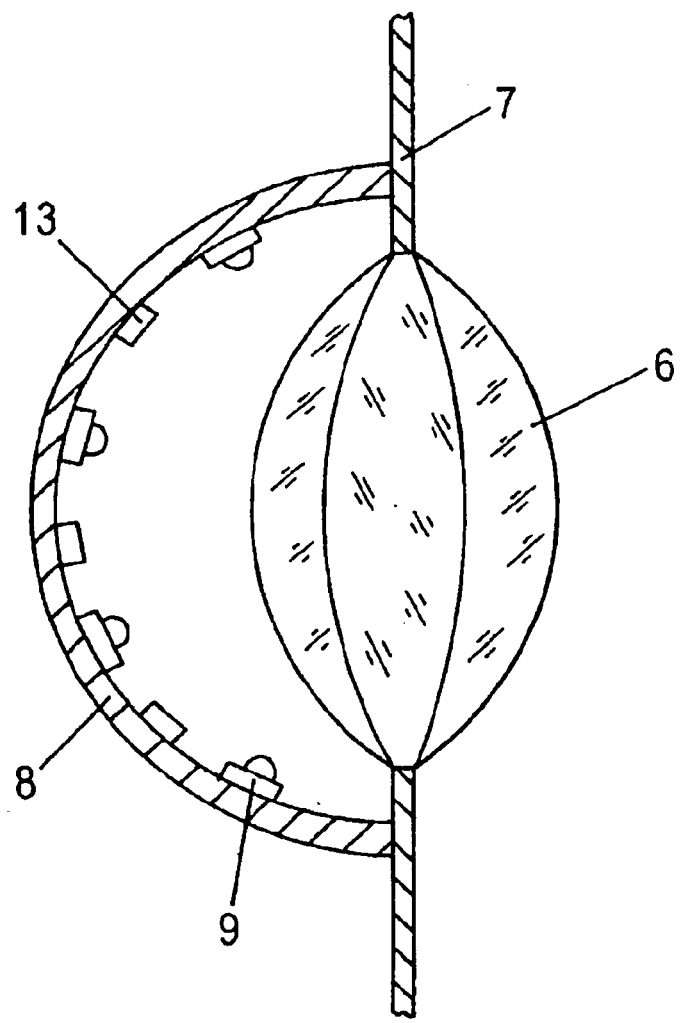
FIG. 4 is a simplistic cross-sectional view of an optical device, the transmitters and the receivers installed, for use in a system such as that shown in FIG. 3.

The system of FIGS. 3 and 4 operates in the following way. The signal from the signal source 3 is applied to the modulator 2, which correspondingly modulates the radiation illuminated by the radiation source 9 of the transmitter 1. The forward direction (downlink) radiation from the radiation source 9 approaches the subscriber receiver 4, which is optically conjugated with that radiation source. The output signal of the subscriber receiver 4 is processed by the demodulator 5 and comes to the subscriber (user) terminal device.

The user terminal supplies upstream information to the controller 12. The controller formats the information as necessary and supplies formatted transmit-data to the modulator 11. The modulator 11 modulates the data and supplies a modulated signal to the subscriber transmitter 10 for emission in the reverse (uplink) direction.

At the base station, a receiver 13, conjugated with the respective subscriber transmitter 10 by means of the objective lens 6, receives the radiation and converts it to an electrical signal. The demodulator 14 demodulates the signal to recover the received data. The demodulator 14 supplies the data to the controller 15, for further processing, for example to forward the original subscriber information over a high speed data network.

Besides this, the signal from the subscriber receiver 4 is applied to the analyzer/controller unit 12, the output of which is connected to the modulator 11. Unit 12 analyses the signal, detects communication channel deviations from optimal performance and generates a message for the transmitter terminal to correct the channel. The radiation from the subscriber radiation source 10 bearing such message is applied to the base station terminal receiver 13 and, via the demodulator 14, reaches the analyzer/controller unit 15. In 15, the signal is analyzed to assess the subscriber radiation source tangential displacement relative to the area optically conjugated with the receiver. Such a displacement may cause a degradation of the received signal.

So, if any beam radiated by the system is displaced relative to the subscriber receiver 4 at which it shall be precisely targeted, the analyzer unit detects the fact, and unit 15 issues a command to the drive 16 for turning the transmitter objective lens 6 or shifting one of the transmitter sources 1 or base station receivers 13, to restore the optimum communication conditions.

The feedback system for tracking of the radiation source and the receiver relative positions may be organized also in a different known way, e.g. like it has been revealed in the description for the Japanese patent application No. 01070814, publication No. 022493276, H 04 B 10/10, 1990 /4/. To reduce the energy losses, every receiver may be provided with radiation collectors, which can be implemented as lenses (see the descriptions for the European patent applications No.868039, 1998 and No. 909048, 10/24, 1999), as objectives (see the description for the Japanese patent No. 01268323, H 04 B 9/00, 1989 /7/), or as reflectors (see the description for the Great Britain patent No. 2326786, H 04 B 10/02, 1998 /8/). (Not shown in the Figs., as known).

The proposed optical communication system allows the subscriber (user) to select the required information, e.g. to switch the TV channels. To do this, the subscriber, using the analyzer/controller unit 12, issues a request, which is applied via the modulator 11 to the radiation source 10, and then sent to the receiver 13 of the transmitter terminal. The request received by the receiver 13 is applied via the modulator 14 to the analyzer/controller unit 15 which then issues a corresponding command to the signal source 3, e.g. to switch the TV channel (to select a required one).

To provide a radiation power level necessary to exceed the receiver sensitivity threshold, in certain cases an optical preamplifier (not shown in the drawing) of some known type may be introduced into the receiver.

The proposed device, providing optimized optical conjugation between the receivers and the radiation sources, which is achieved by the new transmitter design, reduces energy losses caused by lack of the beam concentration and angular instability of the beam axis during the communication process, which in turn allows to reduce its energy consumption, weight, and size, thus increasing a communication system efficiency.

Figure 5:
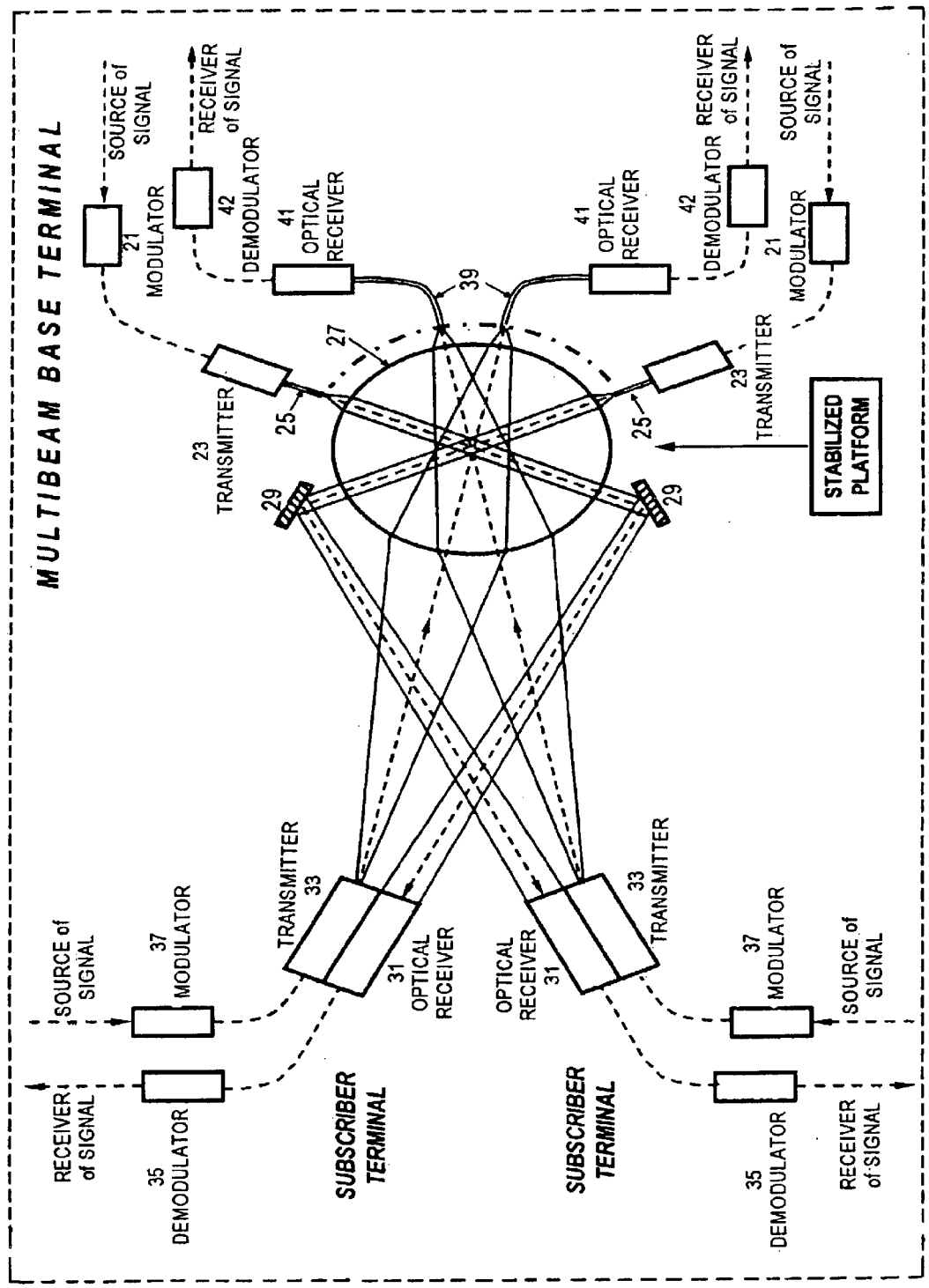
FIG. 5 is an optical functional block diagram of a system including a multibeam base terminal and subscriber terminal units, in accord with the present invention.

FIG. 5 depicts the schematic diagram of a multibeam duplex optical communications system of a preferred embodiment using a spherical objective lens. The system may offer the capability of wireless (optical) data transmission from a base station to several user/subscriber terminals with data rates of approximately 500–600 Mbit/s over each channel (downlink) and 250–300 Mbit/s (uplink) at the distances up to 2,000 m with availability 99.00%–99.99% depending on climate conditions.

A distinctive feature of the preferred versions of the communications system is the use of a single (for all users) wide-angle objective lens shaped as a concentric objective, particularly a sphere, as a means of a transmit objective lens of the base station. The same lens is also used to receive data from all user terminals. This type of base station optical module design makes it least expensive and most compact.

A modulator 21 receives a signal for communication from a source. Emission of the transmit laser (transmitter) 23 of the base station is intensity-modulated in time in accordance with the electric signal coming from the information source and represents a sequence of rectangular pulses. The transmit laser 23 sends the modulated beam through an optical fiber pigtail 25 to the spherical lens 27. Having gone through the wide-angle objective lens 27, the emission is transmitted as a thin beam (15–20 millimeters in diameter) with low divergence. It is directed onto a user terminal located at a distance of up to 2 km by means of a swivel exit mirror 29. The base station transmit laser represents a laser 23 diode emitting on a wavelength of 785 nm or on 1550-nm.

A user terminal includes an optical receiver 31 and an optical transmitter 33. The user receiver system consists of a narrow-angle-of-view reflector-type telescope, a photoreceiver subsystem, and demodulator 35 processing incoming data and supplying data to an appropriate receiver. The user transmitter system consists of several (4 units) 785-nm laser diodes with low-aperture shaping optics that emit narrow beams in the direction of the base station. These elements output optical radiation in response to a signal from a modulator 37.

Several emitters are necessary, located at a distance from each other, for suppressing intensity fluctuations caused by atmospheric turbulence. The distance between emitters exceeds the correlation radius of atmospheric inhomogeneities. Another requirement to this separation between the emitters is that the feaures of interference patterns created by pairs of the different emitters are of smaller scale than the receiving aperture at the base terminal.

As was mentioned above, due to the base station optical module's original design, emission coming from user terminals is received with the use of the same spherical objective lens used for shaping laser emissions transmitted to the users. Emissions received from separate users are concentrated in vicinity of the focal surface of the spherical lens 27 in areas optically conjugated with the respective user terminals. Ends of 0.5–1 mm-thick light guides 39 channel the emissions to base station receivers 41. This configuration of energy conveyance enables data reception from users located randomly within the maximum angle allowed by the spherical objective lens 27 (±50 degrees in vertical and horizontal planes). At the same time, the configuration enables resolving closely spaced user terminals as well. Demodulators 42 process the received signals and supply data to upstream elements, for example for further communication via a high speed network.

In practice, angular drifts are possible of the base station optical transmit module's support surfaces caused by sways of the building holding the base station and of the support-and-swivel mechanism. Therefore, it is necessary to implement methods of collective (for all users) angular stabilization of beams originating from the base station optical transceiver module. Creation of such a stabilization system is proposed. Passive building vibration isolation systems will also be used. Also, for a typical rooftop installation, the transmitter elements are adjusted to produce an illumination "spot" (beam diameter) of approximately 0.5 to 2.0 meters at each respective receiver.

The base station transmit module contains 20–50 optical channels providing for transmission of light from 20–50 radiation sources to subscriber receivers. In general, we may use several optical channels per subscriber receiver to increase availability and reliability of communication. The number of subscribers serviced by the transmit module may be equal, for example 10, if we have 30 channels and assign three channels per subscriber.

Figure 6:
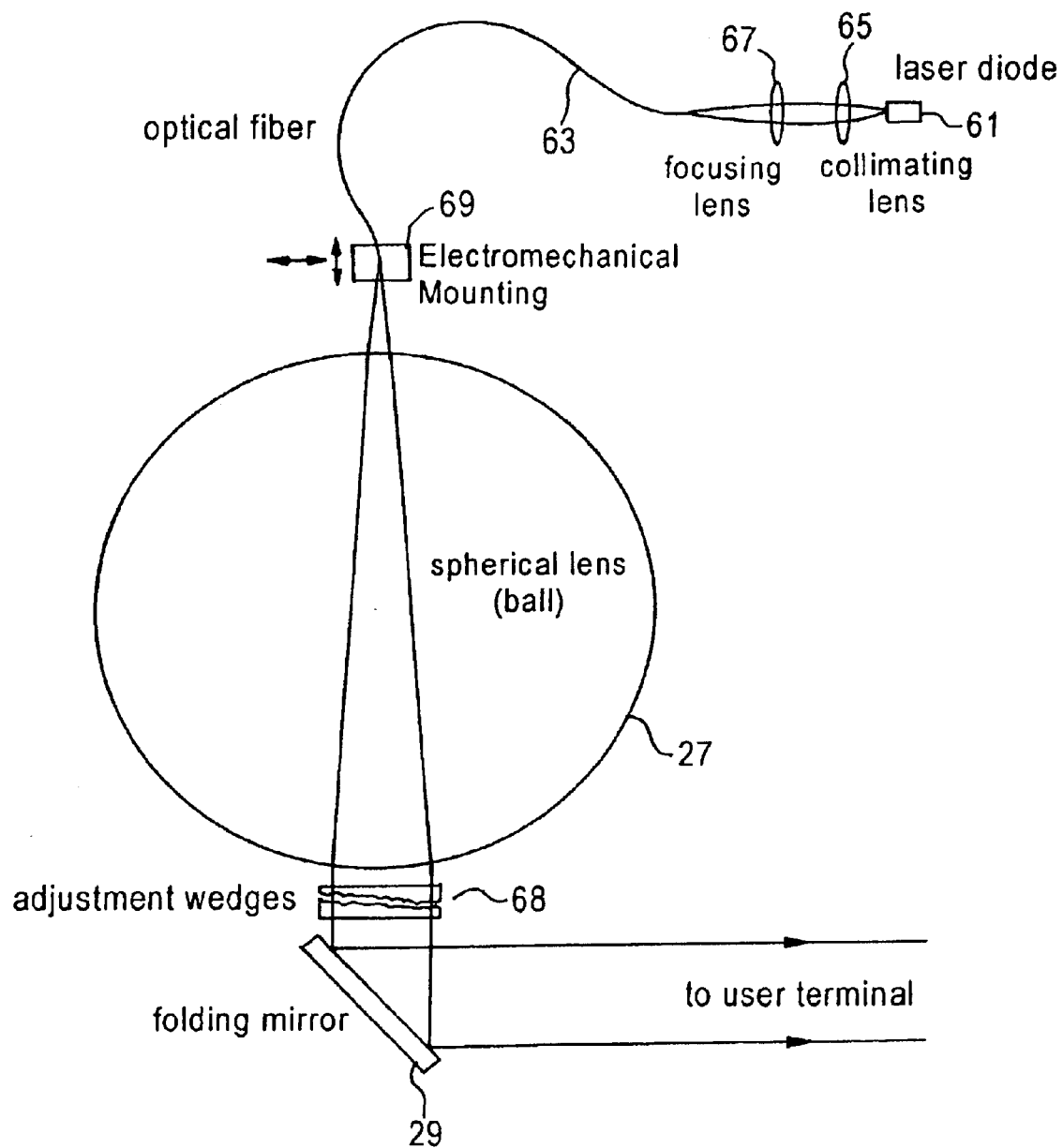
FIG. 6 is a schematic diagram of one channel of a base station transmit-module.

Optical Schematic Diagram of one of Base station transmit channels for the preferred embodiment is presented in FIG. 6. Optical radiation from a laser diode 61, for example HL 5972, is coupled to an optical fiber 63 using a coupling lens system, comprising a collimating lens 65 and a focusing lens 67. Optical fiber 63 delivers optical radiation from the diode 61 to a curved focal surface of the spherical lens 27. The spherical lens 27 collimates radiation (converts diverging light beam output from the optical fiber 63 into a collimated light beam with small divergence). The collimated optical beam passes through a pair of adjustment wedges 68 and is directed by a folding mirror 29 at one of the subscriber terminals. The adjustment wedges 68 provide for precise targeting of the beam at the subscriber terminal.

Figure 10:
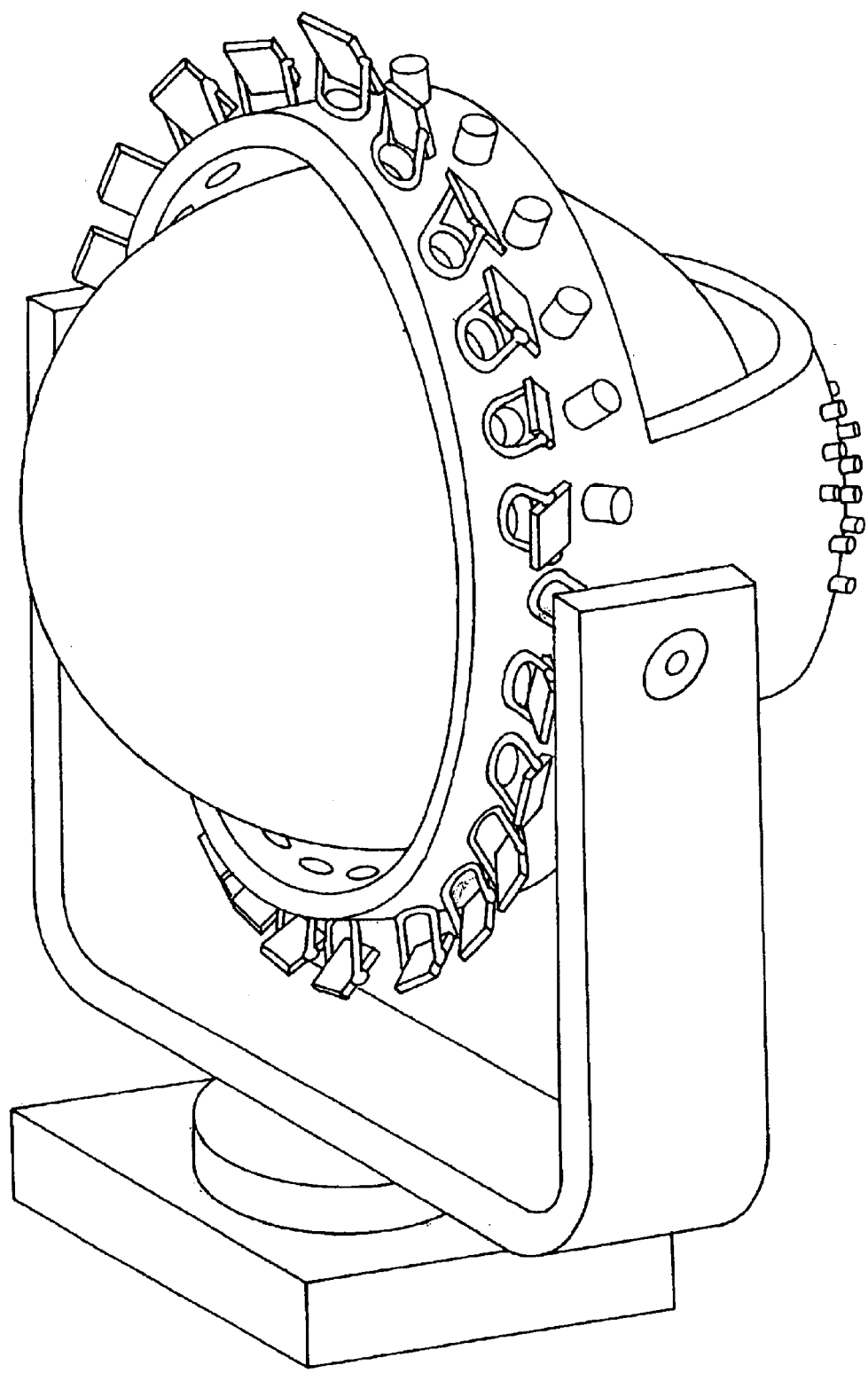
FIG. 10 is an isometric view of the optical system components of a base station for use in a free-space communication system in accord with the present invention.

The folding mirror 29 and the adjustment wedges 68 ensure precise targeting of the beam in the situation when the base station as well as the subscribers are mechanically stable (i.e. their coordinates and angular orientation are not changing). Mechanical instability of the base station, caused for example by sway, twist and binding of a building on which it is installed, may be mitigated by rotation of the spherical lens around its center. Such rotation is performed as a of way compensating for building instability and as a result collectively stabilizes directions of all optical beams targeted at all subscribers. The lens mounting is designed to provide for lens rotation around its center (see FIG. 10 presenting the isometric drawing of the base station terminal optical system).

Having gone through the spherical lens and having a quasi-flat wave front, the beam is directed to a user terminal by the folding mirror 29. Longitudinal movement of output end of the optical fiber 63 along the beam axis enables changing the wave front curvature and, therefore, changing the diameter of a lighted area in the plane of a subscriber. By making the beam diameter smaller it is possible to increase concentration of the beam energy on a sensitive area of the subscriber receiver. However, the tolerance of the beam targeting at the subscriber becomews tightener in such case.

Pointing the beam onto a user terminal is done in two steps. During the first step, rough pointing (with an accuracy of ~0.5–1°) is conducted by swiveling the mirror (see FIG. 10). Final pointing (with an accuracy of ~0.5') is executed by means of the two adjustment wedges.

Mechanical instability of individual subscribers may be mitigated by independent tracking of each subscriber by the base station optical beams assigned to it. An electromechanical mount 69 moves the exit end of each fiber delivering optical radiation to the focal surface of the spherical lens along the surface, which allows a change of direction of each collimated beam formed by the spherical lens so that each beam hits exactly the subscriber to which it has been assigned. The same electromechanical mount 69 also may be used to move the fiber end in a longitudinal direction (along the beam axes), to provide for optimization of each beam's diameter at the subscriber terminal.

A closed loop electronic system for driving rotation of the lens and mounting of any individual fiber is briefly described above.

Figure 7:
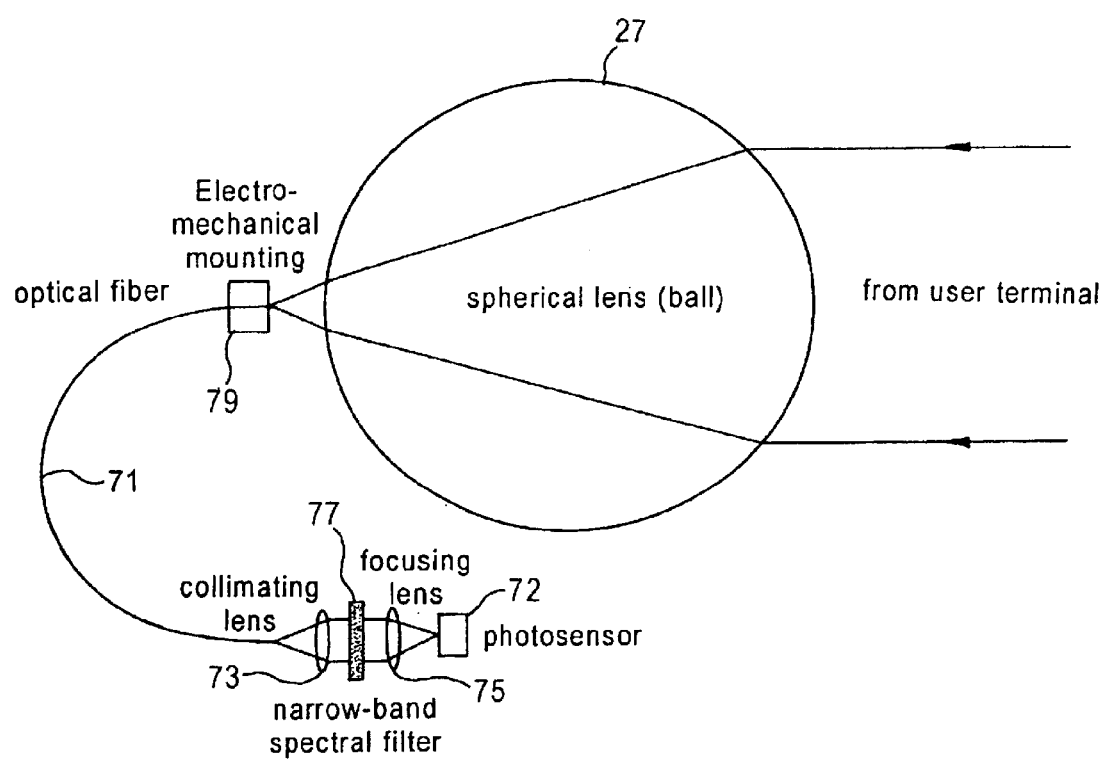
FIG. 7 is a schematic diagram of one channel of a base station receive-module.

The base station Receive Module uses the same spherical lens as being used by the Transmit module. The lens 29 builds images of subscriber terminals near its spherical focal surface. FIG. 7 demonstrates the optical scheme of one of base station receive channels. Optical radiation from one of subscribers is focused by the spherical lens 29 at an entry end of one of optical fibers 71. The entry end of the fiber 71 is located on the distance from the center of the lens 29 where maximum concentration of optical radiation on it is achieved. The exit end of the fiber 71 is optically conjugated with a photosensor 72 using a collimating lens 73 and a focusing lens 75. A narrow-band spectral filter 77 is located between the lenses 73 and 75, through which only radiation emitted by a subscriber terminal passes.

The entry end of each fiber 71 may be moved collectively with the spherical lens 29, to provide for compensation of instabilities of a building accommodating the base station. The drawing also shows an electromechanical mounting 79. Individual tracking is performed the same way as for the Transmit Module—via moving the entry end of each fiber 71 along the focal surface. Positioning of the entry end in longitudinal direction (along beam axis) also may be performed using the same kind of electromechanical mount 79.

Calculations have shown that the entire amount of energy of a beam with a diameter of 60 mm fallen on a sphere with a diameter of 128 mm made of Heavy Flint HF-10-type optical glass is focused into a spot with a diameter of 1 mm. Emission, which falls onto the spherical lens outside of the said pupil, is not added to the emission gathering into the 1-mm spot but is distributed more or less uniformly along the focal surface. Besides, the light rays that fall into the 1-mm spot arrive within anglular range of no wider than ±15° with respect to the normal of the focal surface, but beams that miss the 1-mm spot arrive to the focal surface at wider angles.

It means that if an optical fiber with a diameter of 1 mm and an aperture angle of 30° was chosen as the receive light waveguide, the receive system will capture only emission from its corresponding user terminal. Emissions from neighboring terminals will not be captured by the receive light waveguide.

Figure 8A:
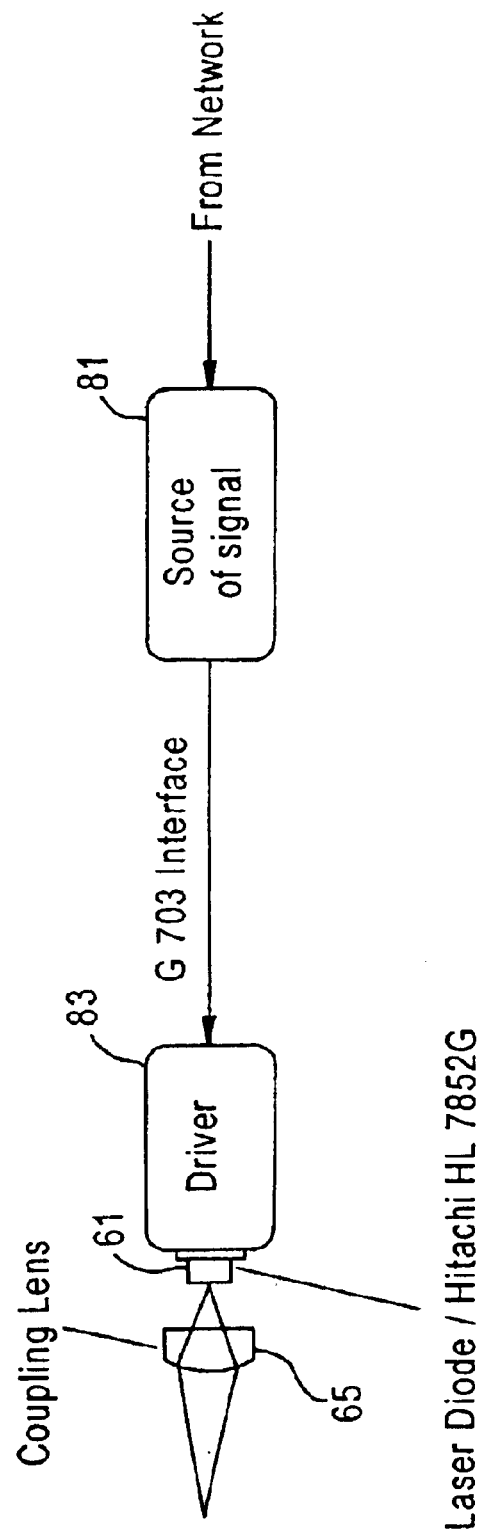
FIG. 8A is an optical functional block diagram of one of the transmitters of the multibeam base station.

FIG. 8A shows one of base terminal transmitters. The transmitter consists of a Source of Signal 81 to be delivered to one of the subscribers, for example from a data network. The source 81 is connected to a laser diode driver 83 via standard interface. The driver 83 performs the functions of a modulator as well as of an automatic system controlling output power level and other parameters at the laser diode 61. A coupling lens 65 couples optical radiation from the laser diode 61 to an optical fiber (shown in FIG. 6) delivering the radiation into vicinity of the focal surface of the spherical lens.

Figure 8B:
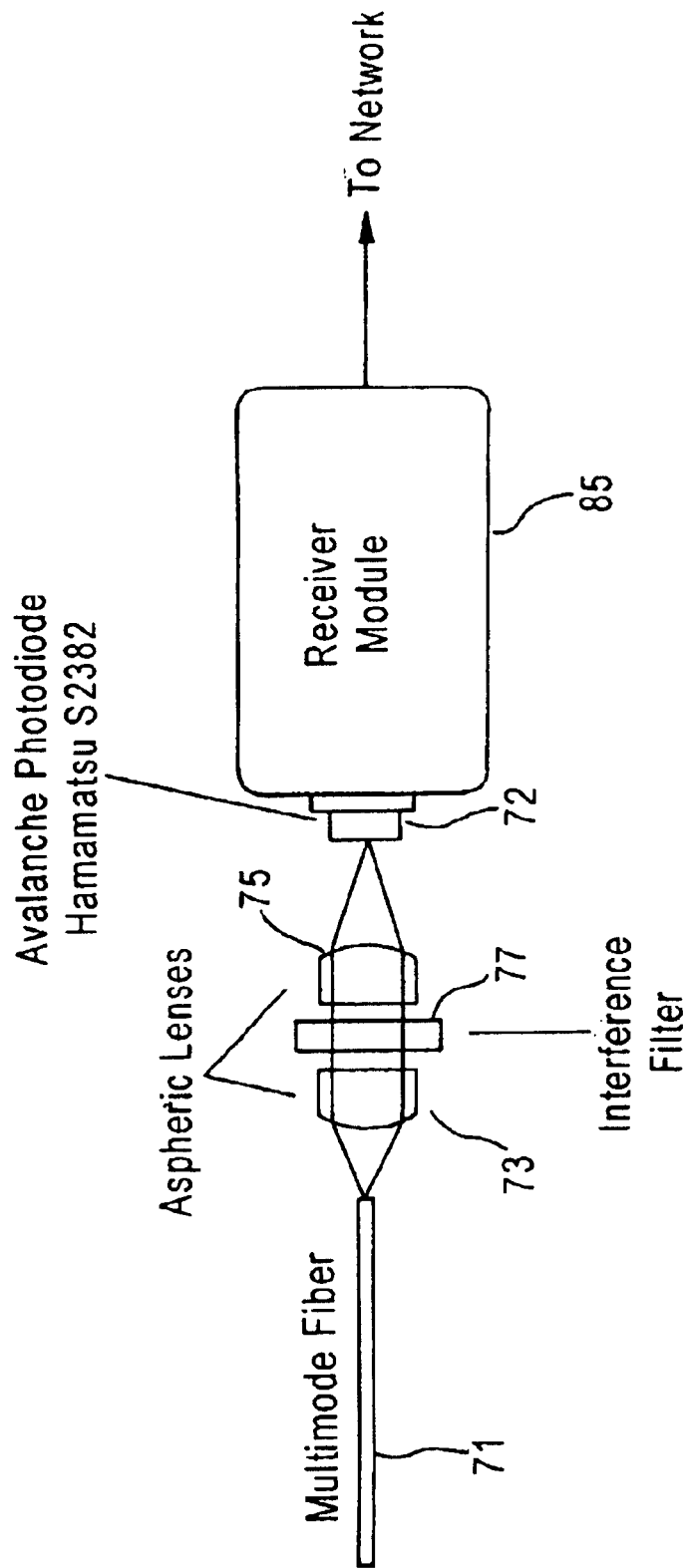
FIG. 8B is an optical functional block diagram of one of the receivers of the multibeam base station.

FIG. 8B shows one of base terminal receivers. The receiver consists of a multimode fiber 71, channeling laser radiation sent by one of the subscribers, from the spherical lens focal surface to a pair of aspherical lenses 73 and 75, between which an Interference Filter 77 is installed. The first aspherical lens 73 decouples the radiation from the fiber 71 and collimates it. The collimated beam passes through the Interference Filter 77 that filters out radiation with wavelengths not corresponding to the radiation generation by the subscriber's radiation source. The second lens 75 couples the radiation to Avalanche Photodiode 72. A receiver module 85 demodulates the signal and passes it to a recipient of the information, for example to the data network.

FIG. 9 shows the elements of one subscriber terminal 90. The subscriber terminal 90 consists of a Receive Module 91 and a Transmit Module 93. The Receive Module 91 consists of a receive telescope 94 at which one of the base station optical beams is targeted. Optical radiation from the base station is concentrated by the telescope 94 around its focal surface. A pair of lenses 95 and 96 decouples the radiation from the telescope focal surface and couples it to Avalanche Photodiode 97 that converts it into electric current. The Demodulator 98 shown in the picture demodulates the signal and passes the information to the subscriber device. Interference Filter 99 lets through only the radiation from the base station radiation source.

The Transmit Module 93 includes a Source 101 of Signal from the user device. The Module 93 also includes a Shaper 102 providing electric coupling of the Source 101 to the Drivers 103. The Drivers 103 provide modulation of Laser Diodes 104 and control of the Diodes output parameters. The Laser Diode radiations are collimated by aspheric lenses 105 and sent to the base station optical receiver. Several transmitter drivers 103, Laser Diodes 104 and aspheric lenses 105 are used at the subscriber Transmit Module 93, to dampen optical scintillation at the base station receive optical element (the spherical lens), and as a result to increase availability and reliability of communication.

The drawing on FIG. 10 illustrates the spherical lens inserted into a mount providing for its rotation around the center. Folding mirrors are installed adjacent to the lens and look like sunflower petals. Cylinders behind the petals show mounts into which exit ends of the fibers delivering radiation from base station radiation sources shall be inserted. Each mount is equipped with an electromechanical system providing for movement of the optical fiber exit end along the focal surface of the lens and in longitudinal direction. Cylinders behind the back surface of the lens mount show the mounts where entry ends of the fibers delivering radiation to base station photosensors shall be inserted. Each such mount is equipped with an electromechanical system providing for movement of the fibers' entry ends along the focal surface of the lens and in longitudinal direction.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. An optical communication system comprising:
a plurality of remote subscriber receivers with optical demodulation means; and
an optical base terminal comprising:
a transmitter implemented as a plurality of base terminal optical radiation sources driven by associated modulators, the base terminal optical radiation sources provided with fiberoptic transmitting pigtails, where output ends of the pigtails are positioned on a curved surface; and
a single wide-angle objective lens located between the output ends of the transmitting pigtails and paths to the remote subscriber receivers,
wherein the output ends of the transmitting pigtails are positioned on the curved surface in areas optically conjugated with the remote subscriber receivers relative to the wide-angle objective lens.

2. A system as in claim 1, further comprising a mounting supporting the output end of each transmitting pigtail on the curved surface enabling movement along the curved surface and along an axis of a respective radiated optical beam.

3. A system as in claim 1, further comprising:
a plurality of remote subscriber radiation sources with optical modulation means; and
base terminal receivers provided with fiberoptic receiving pigtails,
wherein input ends of the receiving pigtails are located on the curved surface and optically conjugated with the subscriber radiation sources relative to the wide-angle objective lens.

4. A system as in claim 3, further comprising a mounting supporting the input end of each receiving pigtail enabling movement along the curved surface and along an axis of a respective received radiation beam.

5. A system as in claim 4, further comprising a mounting structure supporting the objective lens so that it can be rotated together with the output and ends of the transmitting pigtails and the input ends of the receiving pigtails, relative to an arbitrary axis.

6. A system as in claim 1, wherein the wide angle objective lens comprises concentric lens and axes of the fiberoptic pigtails are targeted substantially at the lens center.

7. A system as in claim 6, wherein the concentric lens is a spherical lens.

8. An optical device for multibeam communication of a base terminal to and from a plurality of remote terminals, the optical device comprising:

a plurality of optical radiation sources provided with fiberoptic transmitting pigtails with output ends positioned on a curved surface;

a plurality of optical radiation receivers provided with fiberoptic receiving pigtails with input ends positioned on the curved surface; and a single wide-angle objective lens located between paths for the remote terminals and the output and input ends of the transmitting pigtails and the receiving pigtails respectively, wherein:

the output ends of the transmitting pigtails are positioned on the curved surface in areas optically conjugated with receivers of respective remote terminals relative to the wide-angle objective lens, and the input ends of the receiving pigtails are positioned on the curved surface in areas optically conjugated with radiation sources of respective remote terminals relative to the wide-angle objective lens.

9. A device as in claim 8, further comprising:

a mounting supporting the output end of each transmitting pigtail on the curved surface enabling movement along the curved surface and along an axis of a respective radiated optical beam; and a mounting supporting the input end of each receiving pigtail enabling movement along the curved surface and along an axis of a respective received radiation beam.

10. A device as in claim 8, further comprising a mounting structure supporting the objective lens so that it can be rotated together with the output and input ends of the transmitting pigtails and the receiving pigtails respectively, relative to at least one arbitrary axis.

11. A device as in claim 8, wherein the wide angle objective lens comprises concentric lens and the axes of the transmitting and receiving fiberoptic pigtails are targeted substantially at the lens center.

12. A device as in claim 11, wherein the concentric lens is a spherical lens.

13. An optical device for multibeam communication of a base terminal to a plurality of remote terminals, the optical device comprising:

a plurality of optical radiation sources provided with fiberoptic transmitting pigtails with output ends positioned on a curved surface; and a single wide-angle objective lens located between paths to the remote terminals and the output ends of the transmitting pigtails, wherein:

the output ends of the transmitting pigtails are positioned on the curved surface in areas optically conjugated with receivers of respective remote terminals relative to the wide-angle objective lens.

14. A device as in claim 13, further comprising a mounting supporting the output end of each transmitting pigtail on the curved surface enabling movement along the curved surface and along an axis of a respective radiated optical beam.

15. A device as in claim 13, further comprising a mounting structure supporting the objective lens so that it can be rotated together with the output ends of the transmitting pigtails, relative to at least one arbitrary axis.

16. A device as in claim 13, further comprising an adjustable mirror and a pair of adjustment optical wedges for each path to a respective receiver of a remote terminal mounted in proximity to the objective lens along the path to the respective receiver.

17. A device as in claim 13, wherein the wide angle objective lens comprises concentric lens and axes of fiberoptic pigtails are targeted substantially at the lens center.

18. A device as in claim 17, wherein the wide angle objective lens comprises a spherical lens.

19. An optical device for receiving multibeam communication for a base terminal from a plurality of remote terminals, the optical device comprising:

a plurality of optical radiation receivers provided with fiberoptic receiving pigtails having input ends positioned on a curved surface; and a single wide-angle objective lens located between paths from the remote terminals and the input ends of the receiving pigtails, wherein:

the input ends of the receiving pigtails are positioned on the curved surface in areas optically conjugated with radiation sources of respective remote terminals relative to the wide-angle objective lens.

20. A device as in claim 19, further comprising a mounting supporting each radiation receiver enabling movement along the curved surface and along an axis of a respective received radiation beam.

21. A device as in claim 19, further comprising a mounting structure supporting the objective lens so that it can be rotated together with the input ends of the receiving pigtails, relative to at least one arbitrary axis.

22. A device as in claim 19, wherein the wide angle objective lens comprises a concentric lens, and axes of the fiberoptic pigtails are targeted substantially at the lens center.

23. A device as in claim 22, wherein the concentric lens comprises a spherical lens.

24. An optical communication system comprising:

a plurality of remote subscriber receivers with optical demodulation means; and an optical base terminal comprising:

a transmitter implemented as a plurality of base terminal optical radiation sources driven by associated modulators;

a mounting supporting each of the base terminal radiation sources on a curved surface, enabling movement along the curved surface and along an axis of a respective radiated optical beam; and a single wide-angle objective lens located between the radiation sources and paths to the remote subscriber receivers, wherein the base terminal radiation sources are positioned on the curved surface in areas optically conjugated with the remote subscriber receivers relative to the wide-angle objective lens.

25. An optical communication system comprising:

a plurality of remote subscriber receivers with optical demodulation means;

a plurality of remote subscriber radiation sources with optical modulation means; and an optical base terminal comprising:

a transmitter implemented as a plurality of base terminal optical radiation sources driven by associated modulators;

a single wide-angle objective lens located between the radiation sources and paths to the remote subscriber receivers, the base terminal radiation sources being positioned on a curved surface in areas optically conjugated with the remote subscriber receivers relative to the wide-angle objective lens;

base terminal receivers located on the curved surface and optically conjugated with the subscriber radiation sources relative to the wide-angle objective lens; and a mounting supporting each base terminal receiver enabling movement along the curved surface and along an axis of a respective received radiation beam.

26. A system as in claim 25, further comprising a mounting structure supporting the objective lens so that it can be rotated together with the base terminal radiation sources and the base terminal receivers, relative to an arbitrary axis.

27. An optical device for multibeam communication of a base terminal to and from a plurality of remote terminals, the optical device comprising:

- a plurality of optical radiation sources positioned on a curved surface;
- a plurality of optical radiation receivers positioned on the curved surface;
- a single wide-angle objective lens located between paths for the remote terminals and the radiation sources and receivers, wherein:
- the radiation sources are positioned on the curved surface in areas optically conjugated with receivers of respective remote terminals relative to the wide-angle objective lens, and
- the radiation receivers are positioned on the curved surface in areas optically conjugated with radiation sources of respective remote terminals relative to the wide-angle objective lens;
- a mounting supporting each radiation source on the curved surface enabling movement along the curved surface and along an axis of a respective radiated optical beam; and
- a mounting supporting each radiation receiver enabling movement along the curved surface and along an axis of a respective received radiation beam.

28. An optical device for multibeam communication of a base terminal to a plurality of remote terminals, the optical device comprising:

- a plurality of optical radiation sources; and
- a mounting supporting each radiation source on a curved surface enabling movement along the curved surface and along an axis of a respective radiated optical beam; and
- a single wide-angle objective lens located between paths to the remote terminals and the radiation sources, wherein the radiation sources are positioned on the curved surface in areas optically conjugated with receivers of respective remote terminals relative to the wide-angle objective lens.

29. An optical device for receiving multibeam communication for a base terminal from a plurality of remote terminals, the optical device comprising:

- a plurality of optical radiation receivers;
- a mounting supporting each radiation receiver on a curved surface and enabling movement along the curved surface and along an axis of a respective received radiation beam; and
- a single wide-angle objective lens located between paths from the remote terminals and the radiation receivers, wherein the radiation receivers are positioned on the curved surface in areas optically conjugated with radiation sources of respective remote terminals relative to the wide-angle objective lens.

* * * * *